United States Patent [19]

Steutermann

[11] Patent Number: 4,474,169
[45] Date of Patent: Oct. 2, 1984

[54] SOLAR HEAT COLLECTOR CONTROL DEVICE

[76] Inventor: Edward M. Steutermann, 1332 S. Second St., Louisville, Ky. 40208

[21] Appl. No.: 349,765

[22] Filed: Feb. 18, 1982

Related U.S. Application Data

[63] Continuation-in-part of Ser. No. 156,063, Jun. 3, 1980, abandoned.

[51] Int. Cl.$^3$ .................................................. F24J 3/02
[52] U.S. Cl. ..................................... 126/422; 126/419; 165/34
[58] Field of Search ............... 126/417, 419, 420, 422, 126/452; 165/34, 102, 101; 364/183; 237/2 R, 2 A

[56] References Cited

U.S. PATENT DOCUMENTS

| | | | |
|---|---|---|---|
| 3,981,295 | 9/1976 | Minnick | 126/440 |
| 3,994,279 | 11/1976 | Barak | 126/422 |
| 4,031,880 | 6/1977 | Devin | 126/419 |
| 4,121,566 | 10/1978 | Radenkovic | 126/422 |
| 4,126,122 | 11/1978 | Bross | 126/422 |
| 4,168,030 | 9/1979 | Timmerman | 165/34 |
| 4,184,481 | 1/1980 | Tornquist | 126/422 |
| 4,257,395 | 3/1981 | Kiieder | 126/422 |
| 4,327,705 | 5/1982 | Steutermann | 126/422 |
| 4,387,422 | 6/1983 | Steutermann | 126/422 |

Primary Examiner—James C. Yeung

[57] ABSTRACT

A control arrangement particularly useful in solar heat collecting systems utilizing a heat transfer medium which is heated during circulation through first and second solar collectors and emitted to a receiver. The first and second solar collectors, including absorber plates to be heated by the sun, are disposed in generally planor relation. The control arrangement compares a first signal responsive to the temperature of the first solar collector absorber plate with a second signal responsive to a selected reference temperature and provides an output signal to control means which operate valve means to control flow of the heat transfer fluid to the first and second solar collectors. The control means directs the heat transfer fluid from the outlet of the first solar collector to the receiver when the first signal and second signal are in a first relationship and directs the fluid from the outlet of the second solar collector and from the outlet of the first solar collector and from the outlet of the second solar collector to the receiver when the first signal and the second signal are in a second relationship.

In another feature means are provided to control rate of flow of the heat transfer fluid through the first and second solar collectors in response to selected relationship between the first signal and the second signal.

16 Claims, 7 Drawing Figures

SOLAR HEAT COLLECTOR CONTROL DEVICE

BACKGROUND OF THE INVENTION

This application is a continuation in part of my Co-pending application Ser. No. 156,063, filed on Jun. 3, 1980, abandoned.

The present invention relates to heat transfer fluid flow arrangements for solar heating devices and more particularly to flow control arrangements for solar water heating devices. Solar water heaters have long been known to be an efficient method for utilizing solar radiant energy to heat a liquid such as water for subsequent storage and/or use. However, the availability of inexpensive electricity and natural gas has heretofore made the solar water heater a second choice due to its high initial capital inventment requirement. With the present rapidly increasing costs of conventional sources of power, such as electrical, gas or fossil fuels, the interest in solar water heating systems has been rekindled.

In practice, solar heating systems are generally composed of a multiplicity of solar collectors, each having an absorber plate to receive solar energy and an integral fluid receiving coil adapted to carry a heat transfer fluid to receive the heat received on the absorber plate of the collector. The collectors are typically disposed in a southwardly oriented direction in the northern hemisphere and in a northwardly oriented direction in the southern hemisphere.

The heat transfer fluid is circulated to the collectors to be heated and then returned to a receiver where the heat can be exchanged with fluid in the receiver or in some instances utilized directly.

Where several collectors are used the fluid is usually supplied to the collectors in parallel but in some instances fluid is supplied to the collectors in series.

In other arrangements combinations of series and parallel flow are used, but no prior art arrangement is known where the flow is periodically switched between series and parallel in response to changes in circumstances to improve the efficiency of the heat capture.

For example, the sun's rays impinge upon the collector surface at some point in the early morning and the intensity increases throughout the day until approximately solar noon at which time the intensity and the heat received by the solar collector begins to decrease.

Heretofore, solar collector arrangements have been adapted to direct heat transfer fluid through the collectors in a fixed flow path and in most instances at a fixed rate of flow. No prior art arrangement is known where the flow rate and/or the surface area to which the heat transfer fluid is exposed is modified by changing direction of the flow of fluid except my co-pending application Ser. No. 090,265, filed Nov. 1, 1979, U.S. Pat. No. 4,327,705.

U.S. Pat. No. 4,121,566-Radenkovic, provides a solar collecting system where collectors are provided with individual pipes which carry the fluid to be heated and includes thermostatic control valves associated with each of the collectors for transferring to storage only the fluid which has been heated to a predetermined temperature. The Radenkovic arrangement provides intermittent flow during periods when the rate of heat received by the solar collector is insufficient to uniformly heat the fluid to a specified temperature at constant flow.

U.S. Pat. Nos. 3,998,207; 4,019,495 and 4,125,107 teach arrangements for initiating and terminating fluid flow in response to selected conditions such as collector absorber plate temperature.

U.S. Pat. No. 4,168,030 teaches an arrangement to charge heat transfer medium flow between series and parallel in the operation of condensers in power plants.

U.S. Pat. No. 4,184,481 teaches an arrangement utilizing pyramidal heat transfer surfaces operated in response to sun positions.

SUMMARY OF THE INVENTION

The present invention provides a new and useful arrangement to improve use of available radiant energy in a solar collector system including at least two collector panels, and further to reduce the power consumption required in connection with the operation of such system during periods when solar radiation is at reduced intensity.

More particularly, in accordance with the present invention, it is recognized that the normal variation in intensity of solar impingement during the course of the solar day, resulting from movement of the sun, affects the optimum operating conditions of the solar collection system. The present invention provides means to improve collection of useful solar energy without significant expense in new systems or substantial modification of existing systems.

Specifically, where a system is designed to connect multiple collectors in parallel flow, and where the flow rate of heat transfer fluid is fixed to optimize overall heat collection, the outlet temperature form the collectors is low during the early part of the day, increases at midday and decreases during the later part of the day. Depending on the particular arrangement utilized, the system is many times shut down or heat pickup markedly reduced through heat rejection at certain times of the day. Likewise in prior art arrangements where series flow is use to maximize outlet temperature through multiple collectors, there is substantial heat rejection during a significant portion of the day.

Furthermore, in accordance with the present invention it is recognized that in some conditions where the outlet temperature form the solar collects is of importance, as for example in applications where the outlet fluid from the collectors is directly utilized as a source of hot water or where the outlet fluid is circulated to a heat exchange device in a receiver so the heat from a heat transfer medium fluid passes to a second fluid stored in the receiver, prior art devices are generally incapable of maximizing the fluid temperature at the collector outlet while maintaining optimum heat recovery. Arrangements within the scope of the present invention extend the period during which the heat is transferred to fluid in the receiver and minimize heat rejection at the collector. That is, in prior applications where heat transfer fluid is circulated through the solar collectors at a fixed rate the heat received by the solar collector in the early morning hours in insufficient to increase the temperature of the heat transfer medium in the collector sufficiently to provide usable thermal energy and in the late afternoon the flow rate through the collector may be inadequate to prevent heat rejection. In accordance with heat the present invention it is recognized that by modifying the flow rate of the heat transfer fluid and/or the time of exposure of the heat transfer fluid in the solar collector it is possible to extend the operating time of a given collector system and substantially reduce heat rejection.

The present invention further recognizes that by operating in a mode where the heat transfer fluid heat transfer fluid is circulated through at least two solar collectors in parallel flow during part of the day at a rate sufficient to prevent heat rejection and in series flow during the portions of the day when the intensity of solar radiation is diminished, recovery of usable thermal energy is enhanced and the temperature of the outlet fluid can be markedly increased. In addition, devices within the scope of the present invention can be adapted to substantially diminish the power requirements for circulation of the heat transfer fluid during periods when solar intensity is low yet provide heat transfer fluid with substantially inhanced temperature.

More particularly, the present invention provides a control arrangement particularly useful in solar heat collecting systems utilizing a heat transfer medium which is heated during circulation through first and second solar collectors. The first and second solar collectors, including absorber plates to be heated by the sun, can be disposed in generally parallel relation. The control arrangement compares a first signal reflective of a second temperature and provides an output signal to control means which operate valve means to control heat transfer fluid to the first and second solar collectors. The control means direct the heat transfer fluid from the outlet of the first solar collector to the receiver when the first signal and the second signal are in a first selected relationship and directs the fluid flow from the outlet from the first solar collector to the second solar collector and from the outlet of the second solar collector to the receiver when the first signal and the second signal are in a second relationship.

In another feature, means are provided to control rate of flow of the heat transfer fluid through the first and second solar collectors in response to selected relationship between the first signal and the second signal.

Examples of arrangements within the scope of the present invention are discussed hereinafter with reference to the Figures but it is to be understood that various other arrangements also within the scope of the present invention will occur to those skilled in the art upon reading the disclosure set forth hereinbefore.

With reference to the illustrations which show examples within the scope of the present invention:

BRIEF DESCRIPTION OF THE DRAWINGS

With reference to FIGS. 1A, 1B and 1C the charts illustrate hypothetical operating characteristics of a solar panel where a fluid introduced into the collector panel, is heated and is emitted, in the examples shown in FIGS. 1A and 1B, to a reservoir which accumulates the circulating fluid and continuously recirculates the same fluid to the panel. In FIGS. 1A-1C the y axis represents temperature and the x axis represents the operating characteristics of a system where the fluid is circulated to the collector, returned to a receiver and recirculated to the collector so the temperature of the circulating fluid increases during the day.

More particularly, FIG. 1A represents a situation utilizing a high rate of flow of circulating fluid relative to the quantity of fluid retained in the reservoir. Curve 1 represents the temperature of the fluid at the outlet from the collector and curve 3 represents the temperature of the liquid in the receiver.

With reference to FIG. 1B, the illustration shows hypothetical operating characteristics of a system using a lower rate of flow of fluid to the collector and a relatively higher quantity of liquid in the receiver where the curve 4, which is the same a curve 1 in FIG. 1A represents the absorber plate temperature throughout the day. Curve 6 from represents the temperature of the circulating fluid at the outlet form the collector, and curve 7 represents the temperature of the fluid in the reservoir.

Referring again to FIG. 1A it will be seen that as the day progresses the temperature available at the collector absorber is much higher than curve 2, the circulating fluid outlet temperature from the collector, thus illustrating that at a high rate of flow through the collector the outlet temperature is substantially below the available temperature. Accordingly, the temperature of the fluid in the reservoir, represented by curve 3, never reaches the maximum available and in fact the available temperature from the collector as represented by line 2 is substantially below the collector as represented by line 2 is substantially below the maximum available and in many cases below a usable temperature. One advantage of an arrangement shown in FIG. 1A is that the total efficiency of heat collection is high because of the temperature difference between the absorber plate and the liquid flowing through the collector.

Figure 1B:
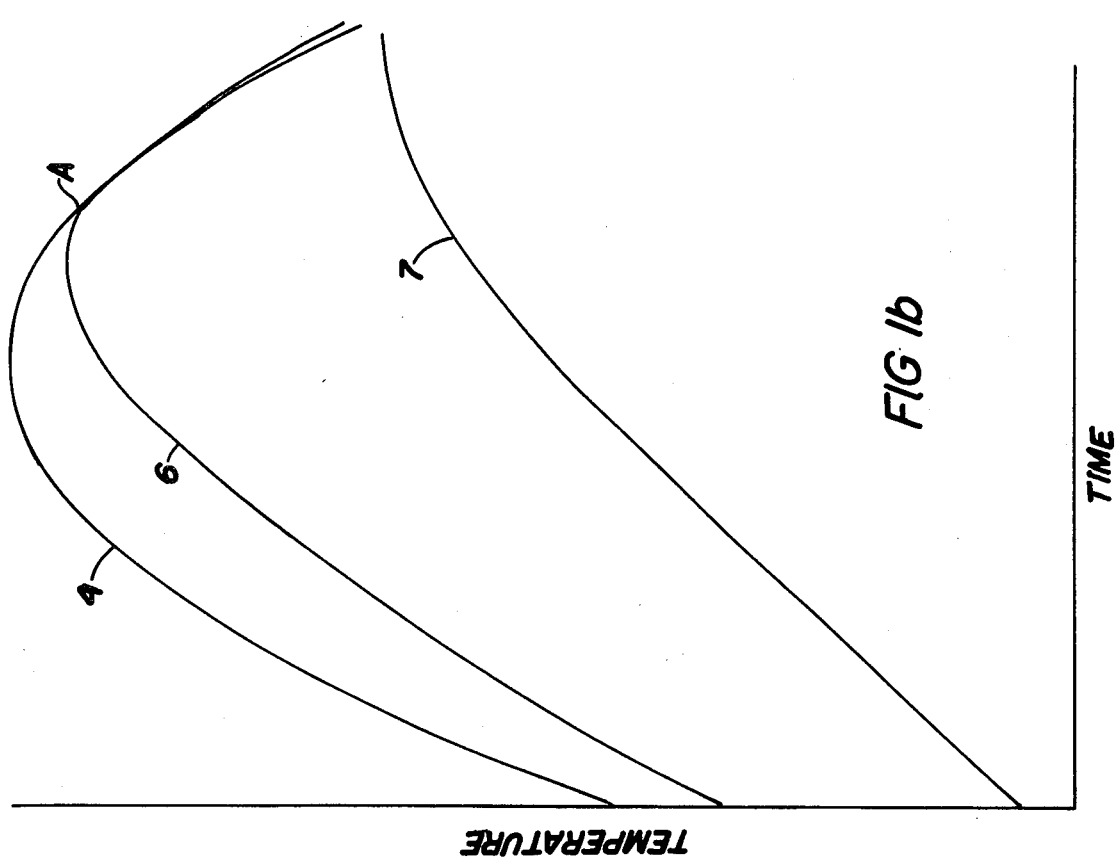
FIGS. 1A, 1B and 1C are charts representing typical characteristics of fluid circulating solar collector arrangements in the prior art.
Figure 1A:
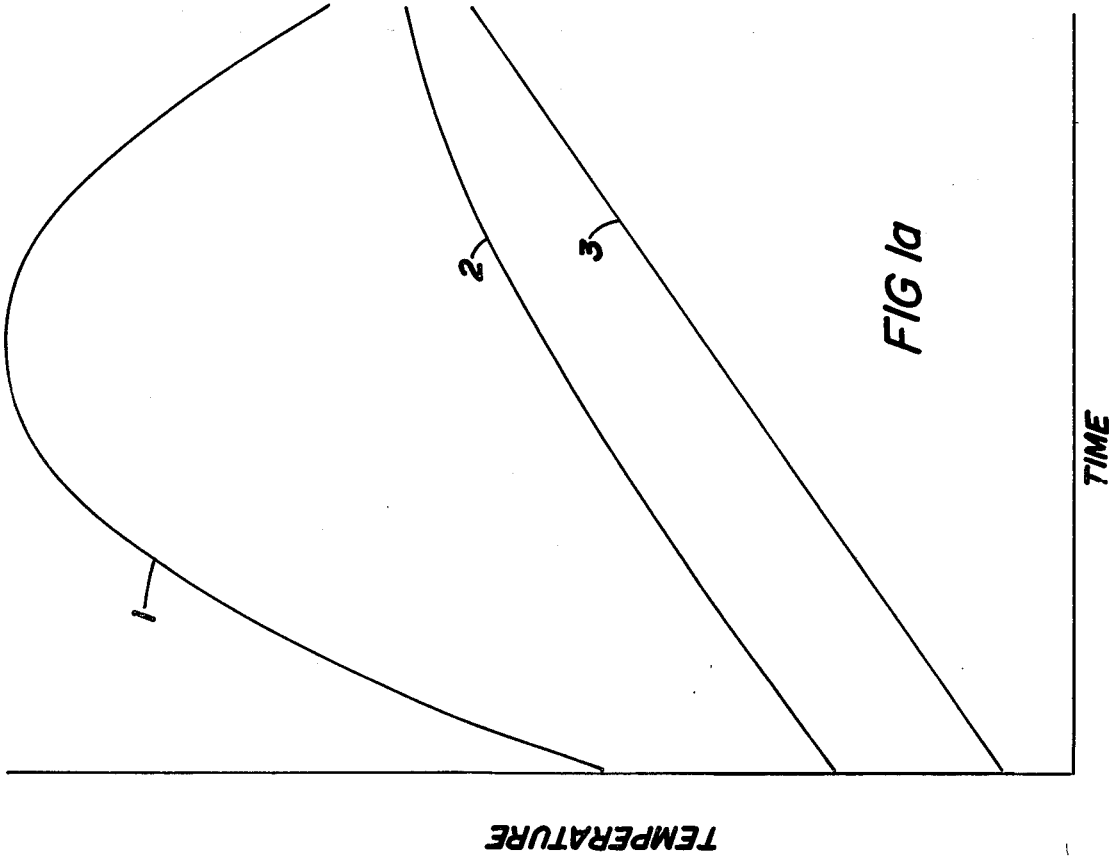

With reference to FIG. 1B, where the rate of flow of the circulating fluid through the the collector is substantially lower, relative to the quantity of fluid in the reservoir the outlet temperature from the collector as represented by curve 6, is substantially higher than for the collector outlet temperatures shown by curve 2 in FIG. 1A. However at a point A the temperature of the circulating fluid from the collector has reached the temperature of the absorber plated represented by curve 4. While the overall available temperature is higher, in most cases at this point heat rejection occurs. That is, the circulating fluid has at some point during the passage through the collector reached the collector temperature and can receive no additional heat from the absorber plate. Therefore heat transfer to the fluid ceases so there is unabsorbed heat at the collector. Accordingly the overall efficiency of the collection system diminishes by this amount. It will also be noted that with reference to FIG. 1B there is a substantial portion of the day when the temperature of the circulating fluid emitted from the outlet of the collector as represented by curve 6 is well below the available temperature from the collector plate so that while the collection efficiency is satisfactory, the temperature of the circulating fluid is below that which is available, and during a portion of a day is below a useful temperature.

Figure 1C:
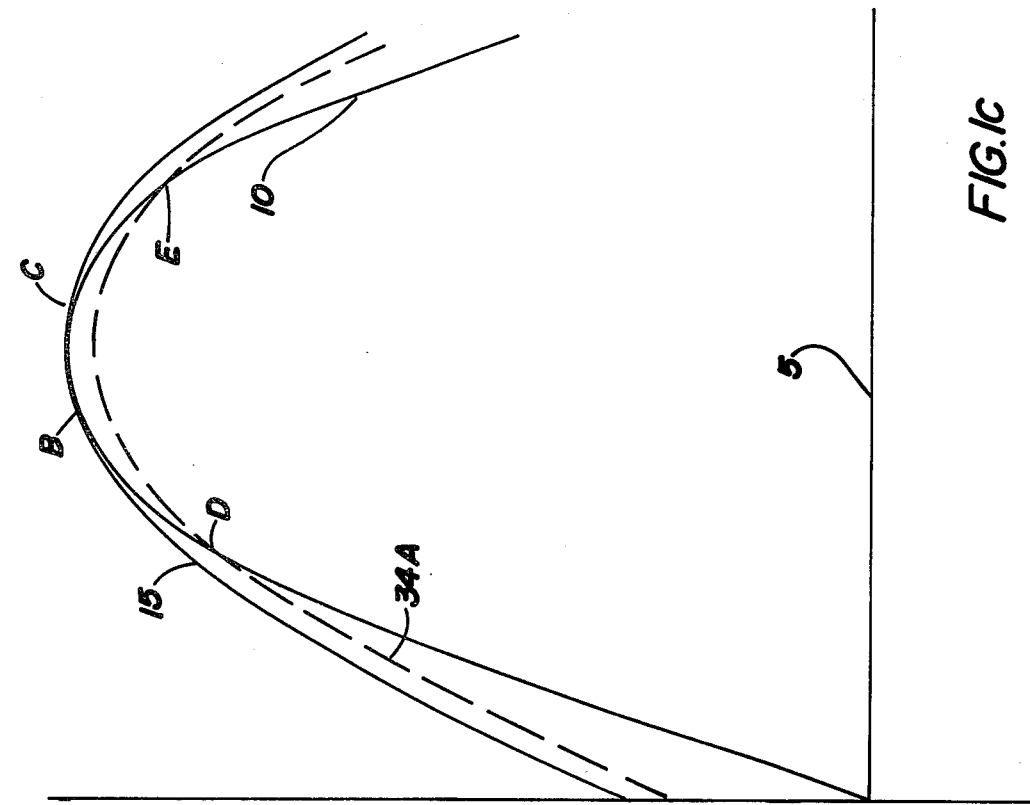

FIG. 1C represents a hypothetical situation where the temperature of the fluid supplied to the collector, represented by line 5, is constant throughout the period. The temperature of the outlet fluid from the collector is represented by curve 10 similar to curve 4 of FIG. 1A and the absorber plate temperature is represented by curve 15. In the situation shown in FIG. 1C, the flow rate of the fluid to the collector has been selected to avoid, as much as possible, heat rejection. Accordingly, curves 10 and 15 intersect between points B and C at the peak temperature and, as shown, there is a substantial portion of the day when the temperature of the fluid at the outlet of the collector is less than the temperature of the absorber plate and for a portion of the day is below a useful temperature where in accordance with the present invention series flow provides the same heat recovery but at a higher temperature and dismissed power requirements.

While the temperature performance of a given collector plate can be improved in the early morning and late afternoon by substantially reducing the liquid flow rate through the collector during such periods the procedure has inherent disadvantages. One is that the heat transfer rate from the absorber plate to the fluid circulating in the coil of the collector is a function of velocity of the fluid in the coil. By substantially reducing the rate of fluid flow through the coil the heat transfer fluid co-efficient is likewise reduced and can result in decreased collection efficiency.

Accordingly, the present invention recognizes the desirability of maintaining an optimum, or highest feasible fluid flow rate through the collector while improving the temperature performance of the collector assembly to avoid heat rejection.

Figure 2:
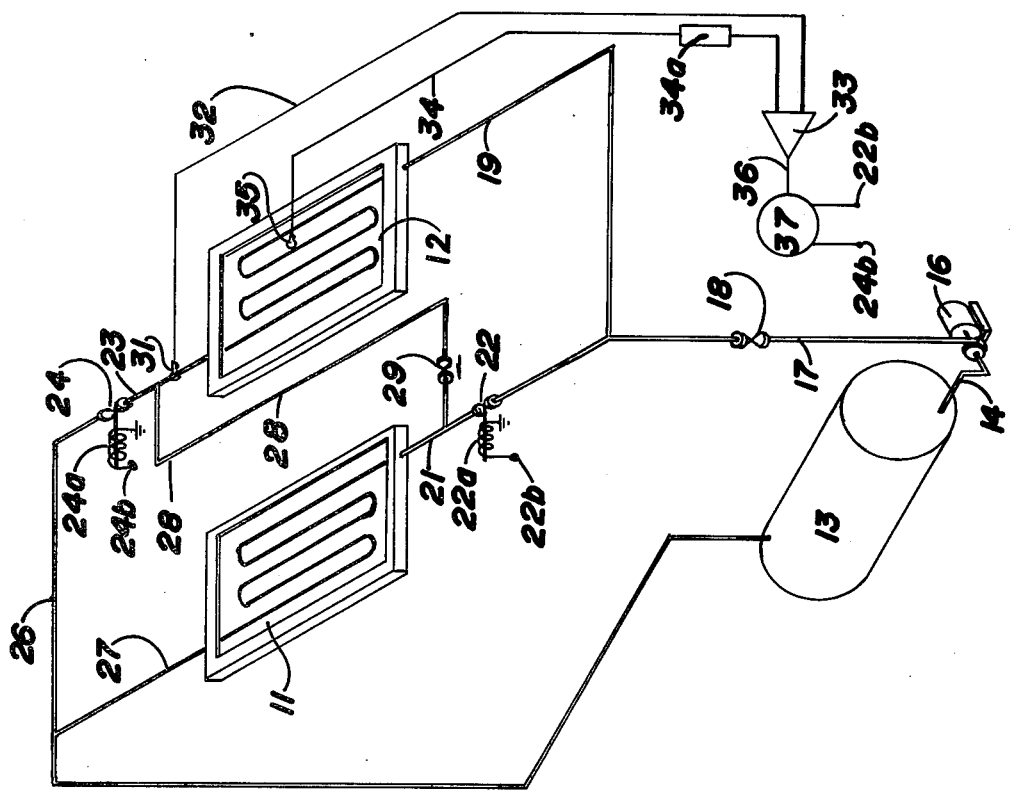
FIG. 2 is a schematic illustration of one arrangement within the scope of the present invention.

One arrangement within the scope of the present invention to accomplish this objective is shown in FIG. 2. In this arrangement collector panels 11 and 12 are provided to receive circulating fluid from a reservoir 13 where an outlet 14 is connected to a pump 16 to circulate the fluid to the collectors by means of a conduit 17. A valve 18 can be provided in conduit 17 to adjust the flow rate from pump 16 at a selected rate which may be varied upon changed conditions. An inlet 21 is provided to collector 11 communicating with valve 18 and pump 16 and an outlet 27 is provided to return 26 to reservoir 13. A valve, for example a normally open solenoid valve 22 operated by a coil 22A having a power input terminal 22B is provided in inlet 21.

Likewise an inlet 19 is provided to collector 12 and an outlet 23 is provided from collector 12 communicating with return 26 to reservoir 13. A normally open solenoid valve 24 can be provided in outlet 23 and includes a coil 24a with an operating terminal 24b. A crossover 28 is provided between outlet 23 of collector 12 and inlet 21 of collector 11 and a valve, for example check valve 29, can be provided in crossover 28.

In the arrangement shown, a temperature sensor 31, for example has a thermocouple to provide an electrical signal reflective of temperature, is provided in outlet 23 of collector 12 to sense the temperature of the circulating fluid emitted from the collector and provide and output signal 32 which reflects the fluid temperature, for example as indicated as curve 10 of FIG. 1C. Signal 32 is supplied to one input of a comparator 33, which can include hysteresis system (not shown) as is known in the art.

A temperature sensor 35 is provided on the absorber plate of collector 12 to sense the temperature available at the collector surface which can indicate the maximum available temperature from the collector and can be reflected as curve 15 of FIG. 1C. An output signal 34 is provided by sensor 35 and supplied to the other input of comparator 33. Sensor 35 can be located in the absorber plate to sense the maximum temperature since at some location on the plate the temperature is lower than the maximum.

Within the scope of the present invention outputs 32 and 34 are compared with or without modification. In the example shown in FIG. 2, modifying means 34a, for example a resitor can be provided to lower or offset the value of signal 34, where the modified signal is shown by dotted lines 34A in FIG. 1C to provide a reference temperature which reflect changes in temperature 15, the temperature of the absorber plate, which intersects curve 10, so that the modified signal provides a reference signal to switch output 36 of comparator 33 depending upon the relative valves of signals 32 and 34A. Curve 34A which represents the temperature signal provided to comparator 33 is proportionately less than the collector absorber plate temperature represent by curve 15 so that as described hereinafter the unit switches to parallel flow at point D prior to coincidence of the outlet fluid temperature and the absorber plate temperature and back to series flow at point E.

It will be understood that within the scope of the present invention various other means of modifying signals 32 and/or 34 to provide a reference signal can be utilized. Input signals 32 and 34 as modified are compared by comparator 33 and a comparator output signal 36 is provided in a digital form depending upon the relationship between the signals 32 and 34. Output 36 is provided to a controller, for example a relay control device 37, which selectively activates and deactivates terminals 22b and 24b of solenoid valves 22 and 24 respectively.

Figure 3:
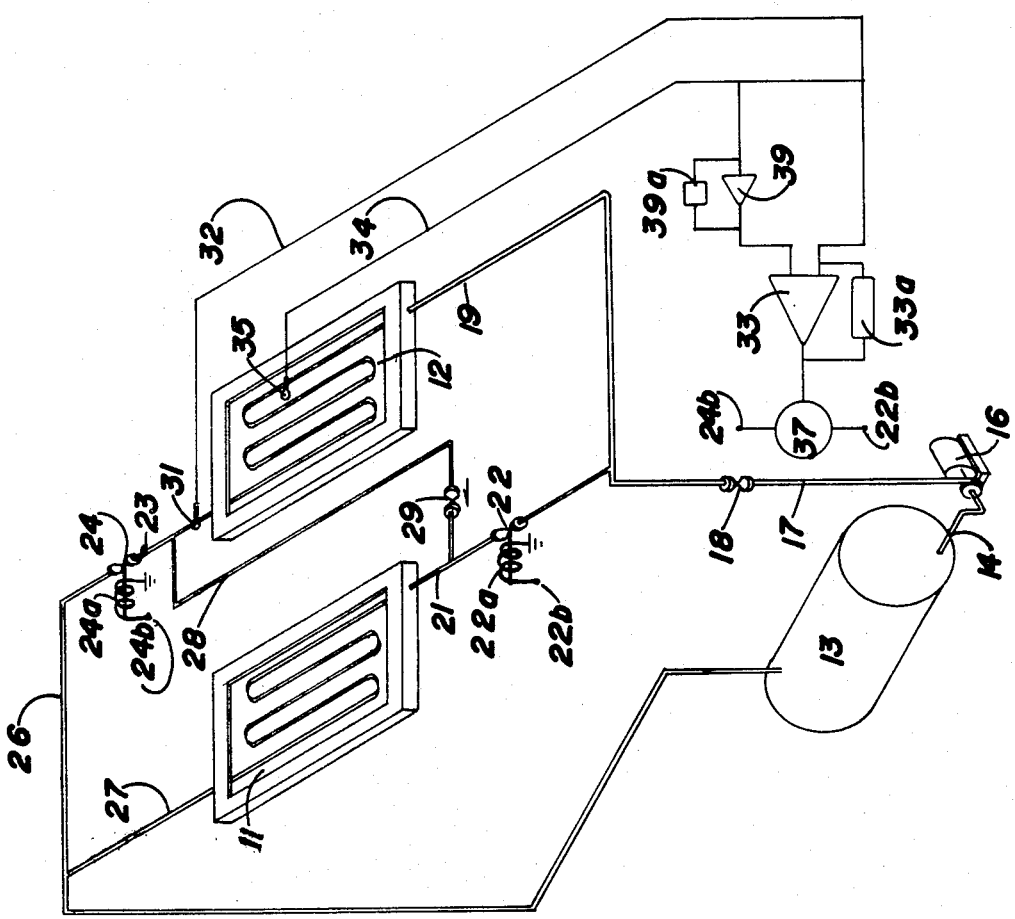
FIG. 3 is a schematic illustration of another arrangement within the scope of the present invention.

In another arrangement within the scope of the present invention as shown in FIG. 3 and described in more detail in my co-pending application Ser. No. 156,071, filed 06/03/80, U.S. Pat. No. 4,387,422 an arrangement can be provided wherein an amplifier 39 can be provided to supply a selected gain, for example 0.1 to 2.0 in signal 34 depending on the desired operating characteristics of the unit and supplied to one input of comparator 33 and where the signals 32 and 34 are sumed and supplied to the other input of comparator 33.

In such an arrangement the signals are interrelated and provide a "trigger point" which is continuously adjusted between the collector absorber plate temperature and the temperature of the outlet fluid but reflected change in both. The exact position of the trigger point is determined by the gain of the amplifier 39.

In the arrangement shown in FIG. 3 if a high gain is provided, it will be recognized that parallel flow occurs at a relatively large temperature difference between the absorber temperature and the outlet fluid temperature. On the other hand if relatively low gain is utilized series flow occurs for a longer period but at some time the outlet temperature from the collector will equal the absorber temperature so heat rejection will occur. Accordingly, the proper gain must be provided for amplifier 39, for example gain circuit 39A to maximize outlet fluid temperature and minimize heat rejection.

In operation, with valve 22 and 24 in the open position fluid flows from receiver 13 to conduit 17 of pump 16 to both collectors 11 and 12 in parallel flow when the inputs 32 and 34 to comparator 33 are in a first selected relation. For example, the temperature sensors 31, 35 and the related outputs 32 and 34 can be selected such that when the temperature of sensor 35 at the absorber plate of collector 12 bears a certain relationship to the temperature sensed by sensor 31 in the outlet fluid from collector 12 parallel flow occurs. As described hereinbefore, for example when the temperature sensed by sensor 31 is selectively below the collector temperature, comparator 33 provides a signal at outlet 36 to operate controller 37 to close valves 22 and 24 so that the fluid flows form pump 16 through outlet 17 to collector 12 then to crossover 28 and through valve 29 to the inlet to collector to inlet 21 of collector 11 then out of collector 11 to the receiver 13.

This mode of operation would be utilized during periods of the day, for example early in the morning as shown in FIGS. 1A–1C where the outlet temperature is substantially below the absorber plate temperature and the fluid would be emitted from collector 12 through collector 11 to receive additional heat and corresponding increase below the absorber plate temperature and the fluid would be emitted from collector 12 through collector 11 to receive additional heat and corresponding increase in the outlet temperature so that higher temperature fluid would be supplied. As the day progresses and the intensity of solar radiation increases the outlet temperature from collector 12 increases to the point where the temperature sensed by sensor 31 has increased sufficiently to reverse the output 36 from comparator 33 and deactivate relay control 37, for example at the intersection of curves 34A and line 5 of FIG. 1C, valves 22 and 24 open allowing normal parallel flow through collectors 11 and 12.

It will be noted that in this mode of operation only approximately one-half the weight of fluid would be circulated to the collectors as compared to the parallel flow to the collectors.

The present invention recognizes that when the collectors are at a substantial elevation above pump 16, and the temperature relations are properly selected, the power consumption of the unit can be substantially reduced by the foregoing decrease in water flow and without loss of thermal efficiency.

The foregoing arrangements are very inexpensive and are particularly useful in the later portion of the day in systems where the fluid heat is circulated to a reservoir which increase in temperature when heat rejection would normally occur. By proper adjustment of valve 18 to permit flow of sufficient heat transfer fluid to preclude coincidence of the outlet temperature from collectors 11 and 12 and the absorber plate temperature during the later part of the day in parallel flow heat rejection is prevented and outlet temperature is maximized during the earlier part of the day when series flow is utilized.

Figure 4:
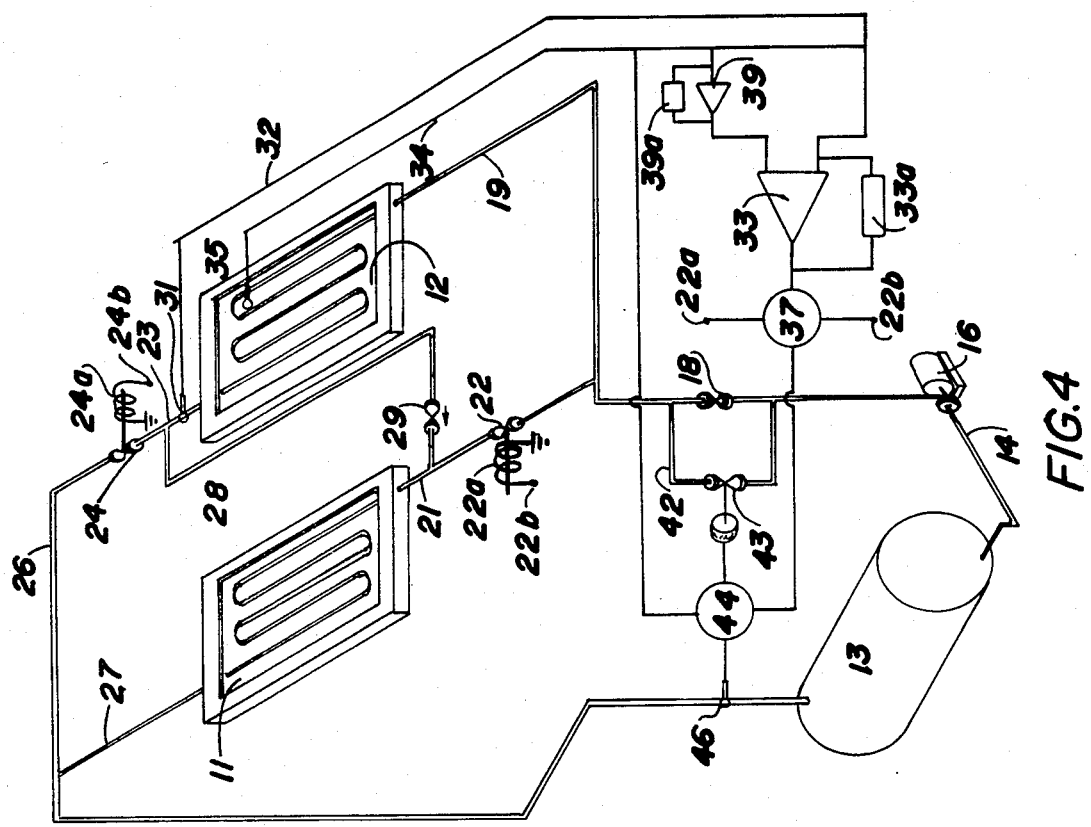
FIG. 4 is a schematic illustration of another arrangement within the scope of the present invention.

FIG. 4 is an illustration of another arrangement within the scope of the present invention utilizing a control s system similar to that shown in FIG. 3 but where a by pass 42 is provided around valve 18 which as previously described is present to provide selected operating characteristics and includes a control valve 43 operated by valve operator 44, sensitive to the temperature of the fluid in return 26. The arrangement operates similarly to that previously described with reference to FIG. 3 except that controller 37 also activates valve operator 44 when valves 22 and 24 are open so that upon occurance of a preselected temperature in return 26 sensed by sensor 46 valve 43 is opened by valve operator 44 allowing flow of fluid through bypass 42 to increase the total fluid flow to the collectors 11 and 12 to prevent equalization of the absorber plate temperature and the temperature in outlets 27 and 23 of the collectors 11 and 12 and consequent heat rejection even in parallel flow.

Figure 5:
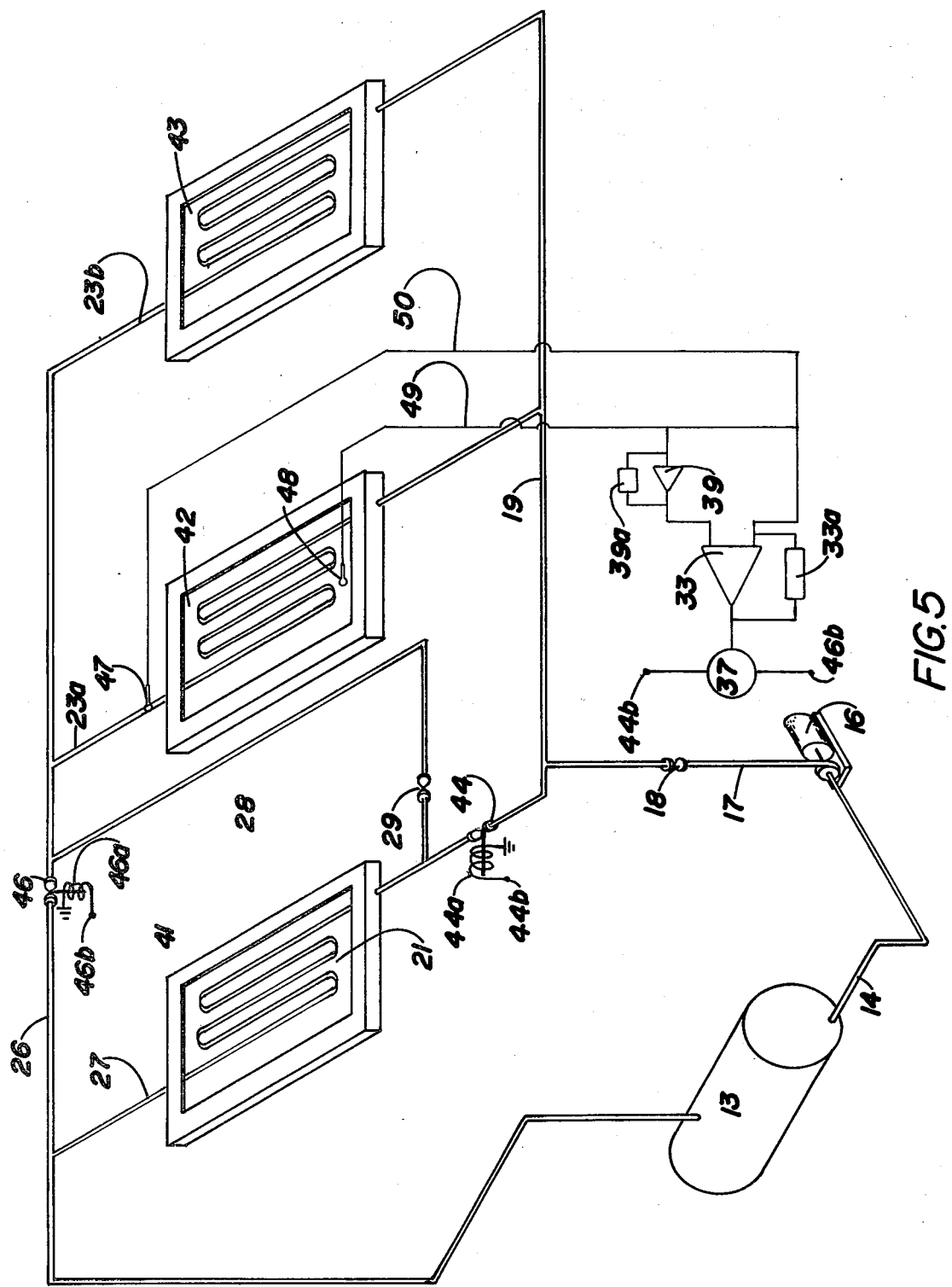
FIG. 5 is an illustration of an alternate panel arrangement within the scope of the present invention.

FIG. 5 presents an alternate arrangement useful in some applications where the requirements of the system are such that in series flow less preheating of the fluid is need so that multiple panels can be used in parallel for preheating and one panel selectively in series will suffice for the final heating. The arrangement shown includes three solar collectors 41, 42, and 43. Collectors 42 and 43 operate in first parallel flow while panel 41 is shifted between parallel operation and series with panels 42 and 43. Valves 44 and 46 are provided to accomplish the series parallel flow as described with reference to FIGS. 3 and 4. Sensors 47 and 48 are provided as shown for temperature detection at the outlet from panel 43 and on the collector absorber plate of collector 42 to provide output signals 49 and 50 similar to signals 32 and 34 of FIGS. 2, 3 and 4 and can be similarly utilized.

Figure 7:
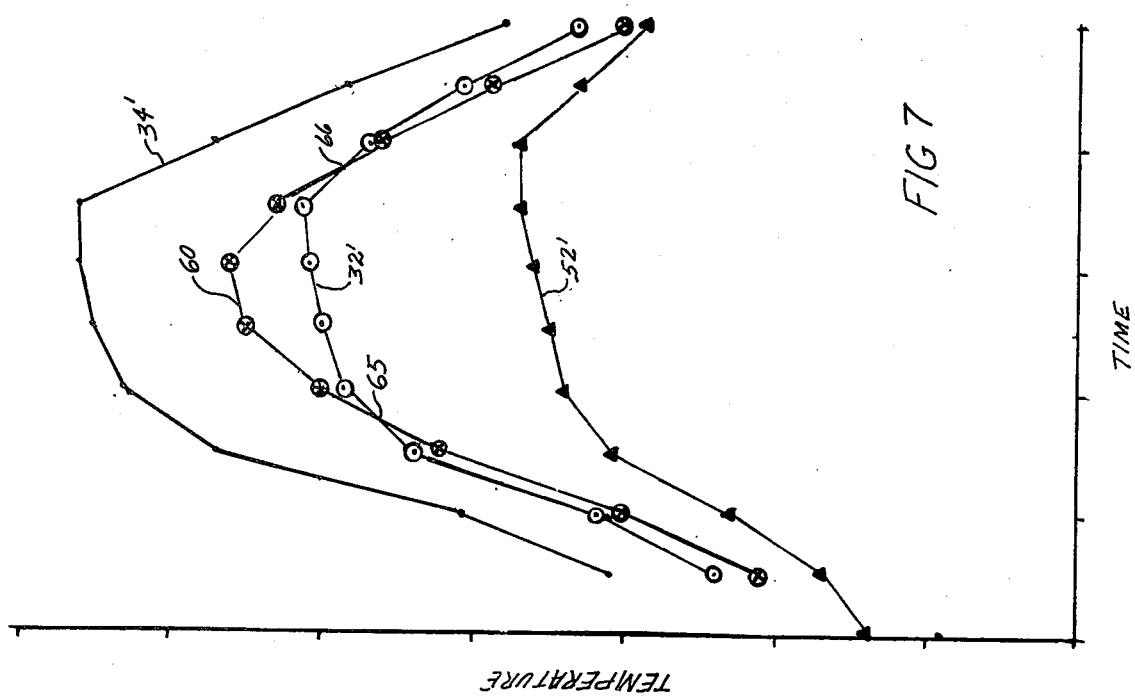
Figure 6:
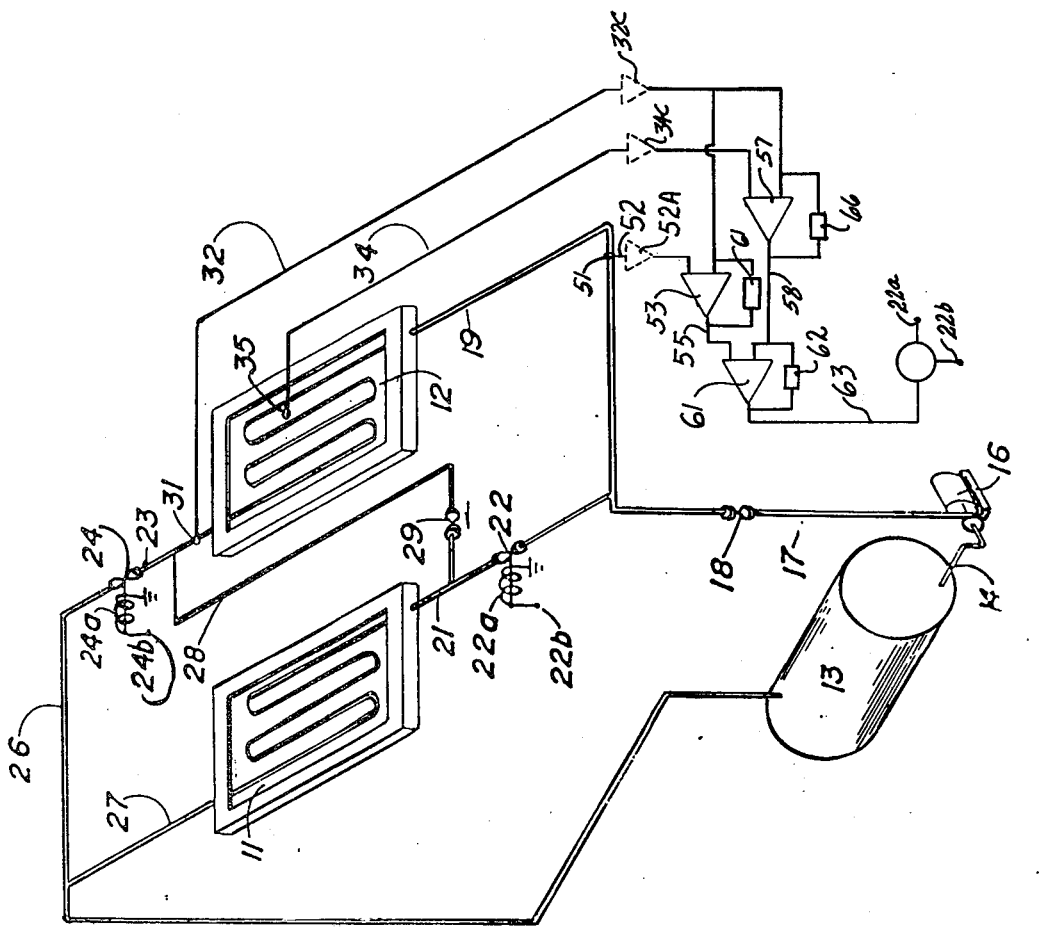

FIGS. 6 and 7 illustrate another mode of operation within the scope of the present invention. In all of the arrangements series parallel flow in collectors 11 and 12 is achieved by summation (positive and negative) and selected modifications of the signals.

The arrangement shown in FIG. 6 is similar to the arrangement shown in FIG. 2 insofar as the reservoir 13, collectors 11 and 12 are concerned and the other elements except a modified control arrangement within the scope of the present invention is shown. In FIG. 6 a sensor 51 is provided in inlet 19 to collector 12 to determine the temperature of the fluid supplied to the collector. Sensor 51 provides an output signal 52. The signals 32, 34, 52 can be selectively modified for addition or subtraction to supply differential signals for operation of comparators. Signals 32 and 34 can be provided with modifying means, for example amplifiers 34C and 32C to condition the signals as desired. A similar amplifier 52A can be provided for signal 52 when needed.

In the arrangement shown, signal 52 is supplied to an input of a summing amplifier 53 which can be provided with a gain circuit 54 where signal 32 from sensor 31 is supplied to the other input of summing amplifier 53 so that an output 55 is provided which is indicative of the difference between the temperature measured by sensor 51 and the temperature measured by sensor 31 is provided. FIG. 7 is a graphic illustration of the time and temperature relationships between the various portions of the arrangement similar to that previously described. A signal 52' is shown in FIG. 7 which is indicative of signal 52 as is a signal 32' which reflects the signal 32.

Signal 34 from sensor 35 located on the collector surface is indicated as signal 34' in FIG. 7 and signal 34 is supplied to one input of a summing amplifier 57 as shown while the other input to amplifier 57 is signal 32 from the sensor 31 located in the outlet of collector 12. Thus the output 58 from amplifier 57 is indicative of the difference between signal 32 and 34.

Outputs 58 and 55 are supplied to a comparator 61 in a manner as previously described where a hysteresis circuit 62 can be provided around comparator 61. An output 62 from comparator 61 is then supplied to the operator 37 for operation of terminals 22a and 22b. In the arrangement shown, providing amplifiers 53 and 57 which operate as simple summing amplifiers with no gain the output signals directly reflect the differences between the temperatures as indicated in FIG. 7 by curves 32', 34', and 51'. In this configuration the flow is switched, in collectors 11 and 12 between series and parallel. The switching points are illustrated as are operating curve 60 where the series parallel switch would occur when the operating curve crosses curves 32', in the example shown at points 65,66. That is, the system would operate in a parallel mode until point 65 is reached at which time operating curve 60 crosses curve 32' so that the system would switch to series operation and would remain in series operation until point 66 is reached at which time the operation would switch back to series. In other words, so long as the difference between signal 32 and signal 34 is greater than the difference between signal 32 and signal 52, series operation is achieved and at the time the difference between signal 34 and signal 32 becomes less than the difference between signal 32 and signal 51, parallel operation commences.

Also within the scope of the present invention it will be understood that various gain settings can be provided by means of adjustment of gain circuit 64, or a similar circuit can be provided with respect to amplifier 57 by gain circuit 66 to alter the configuration of control curve 60 to accommodate various conditions in the operating mode of the device.

It will also be understood that similar results can be achieved by adding signals 52 and 34 and selectively amplifying signal 32 and supplying these signals to a comparator.

It is to be understood that the foregoing are but a few examples of arrangement within the scope of the present invention and it will be recognized that other arrangements likewise within the scope of the present invention will occur to those skilled in the art upon reading the description set forth hereinbefore.

The invention claimed is:

1. A control arrangement for a heat transfer system including a heat transfer fluid, first and second heat sources of generally equal temperature where said first heat source includes first heat transfer conduit means having a heat transfer fluid first inlet and a heat transfer fluid first outlet where heat is transfered from said first heat source to heat transfer fluid flowing in said first heat transfer conduit; said second heat source includes second heat transfer conduit means with heat transfer second fluid inlet means and heat transfer second fluid outlet means for emission of heat transfer fluid from said second heat transfer conduit where heat is transfered from said second heat source to said heat transfer fluid in said first heat transfer conduit, conduit bypass means connecting said heat transfer fluid first outlet to said heat transfer fluid second inlet, heat transfer fluid supply means to selectively supply heat transfer fluid to at least one of said first and second fluid inlets, valve means operable between first mode to supply heat transfer fluid to said first heat source heat transfer fluid first inlet means and said second heat source heat transfer fluid second inlet means and second mode to supply heat transfer fluid to said first heat source heat transfer fluid first inlet and from said heat transfer fluid first outlet to said heat transfer fluid second inlet, first temperature sensor means to sense the temperature of said heat transfer fluid at said first heat transfer inlet; to provide a first signal; second temperature sensor means to sense the temperature of at least one of said first second heat source means to provide a reference signal, comparator means to compare said first signal and said reference signal wherein said comparator means provides a first comparator output signal where said first and reference signals are in first relation and provide second comparator output signal when said first and reference signals are in second relation, valve operator means to operate said valve means between said first mode and said second mode in response to said first and second comparator signals.

2. The invention of claim 1 wherein one of said first and reference signals are modified to provide a modified signal to said comparator means.

3. The invention of claim 1 wherein said first and reference signals are summed to provide a summed output which is supplied to said comparator means while said comparator is supplied with one of said first and reference signals.

4. The invention of claim 3 including amplifier means wherein said reference signal is selectively amplified to provide an amplified reference signal which is supplied to said comparator means along with said signal.

5. The invention of claim 4 wherein the gain of said amplifier means is less than 1.

6. The invention of claim 1 including variable flow valve means to selectively supply variable flow of heat transfer fluid to said heat transfer fluid first and second inlet means in said first mode wherein said variable flow valve means is actuated by said first comparator signal to control flow of heat transfer fluid to said first and second heat sources responsive to difference in said first signal and said second signal.

7. The invention of claim 6 wherein said first heat sources includes at least two separate heat sources where heat transfer fluid flows through said at least two separate heat sources in series flow.

8. The invention of claim 7 wherein said second temperature sensor means sense a temperature reflective of the temperature of said absorber plate.

9. The invention of claim 1 wherein the heat transfer surface area of one of said first and second heat sources is greater than the heat transfer surface area provided by the other of said first and second heat sources.

10. The invention of claim 1 wherein said heat sources include solar collector panels having absorber plates to receive solar energy to supply source of heat.

11. The invention of claim 1 including third heat sensor means to sense the temperature of said heat transfer fluid heat transfer fluid first inlet and provide a third signal comparator means to receive said first reference and third signals and provide first comparator output signal with said first reference and third signals are in first relation and second comparator output signal where said first reference and third signals are in second selected relation.

12. The invention of claim 11 including first summing means to subtract said third signal from said reference signal to provide a first differential signal and second summing means to subtract said first signal from said third signal to provide second differential signal where said first differential signal and said second differential signals are supplied to said comparator means.

13. The invention of claim 12 wherein said one of said first, third and reference signals is selectively modified.

14. The invention of claim 12 including amplifier means to selectively modify one of said first, second and differential signals supplied to said comparator means.

15. The invention of claim 11 including summing means to sum said first signal and said reference signal to provide a first summed signal and amplifier means to selectively amplify said third signal to provide a modified third signal where said first summed signal and said modified third signal are supplied to said comparator means.

16. The invention of claim 15 including amplifier means to selectively modify at least one of said reference and third signals.

* * * * *